(No Model.)
2 Sheets—Sheet 1.
H. NEWLIN.
Machine for Separating Street Refuse and other Material.
No. 239,826. Patented April 5, 1881.
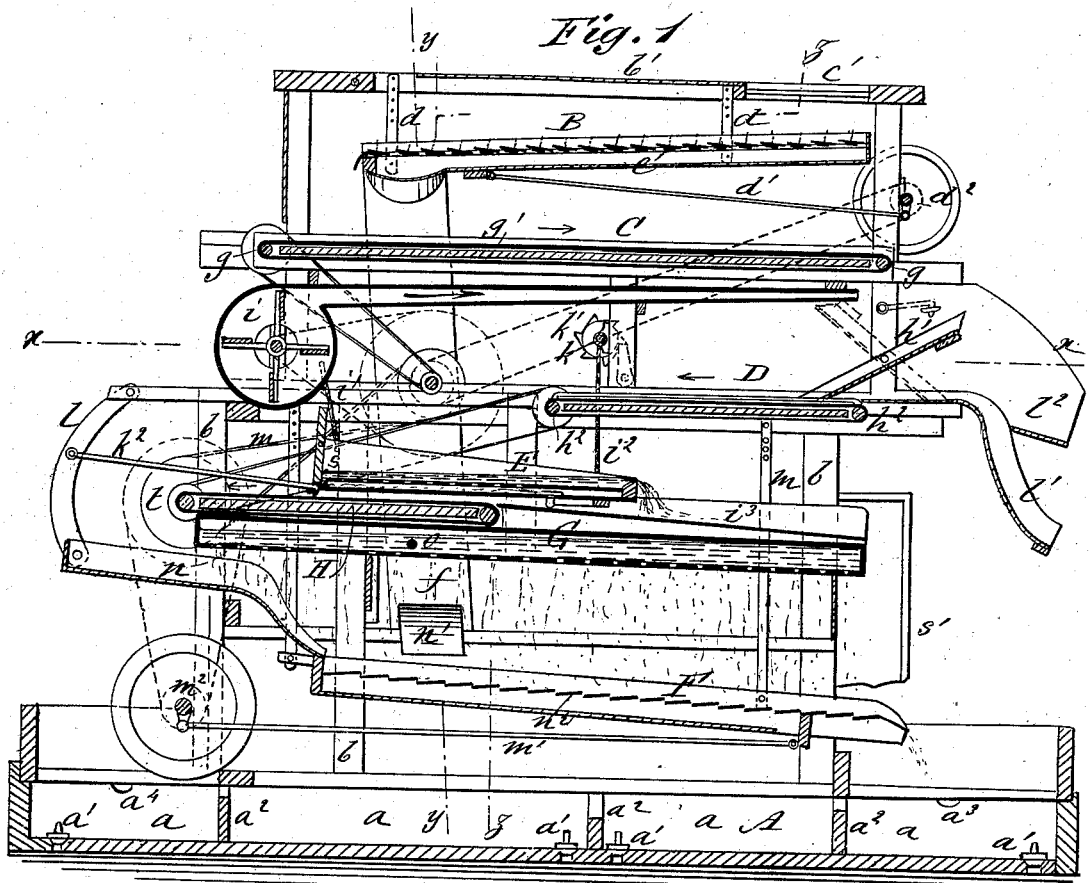
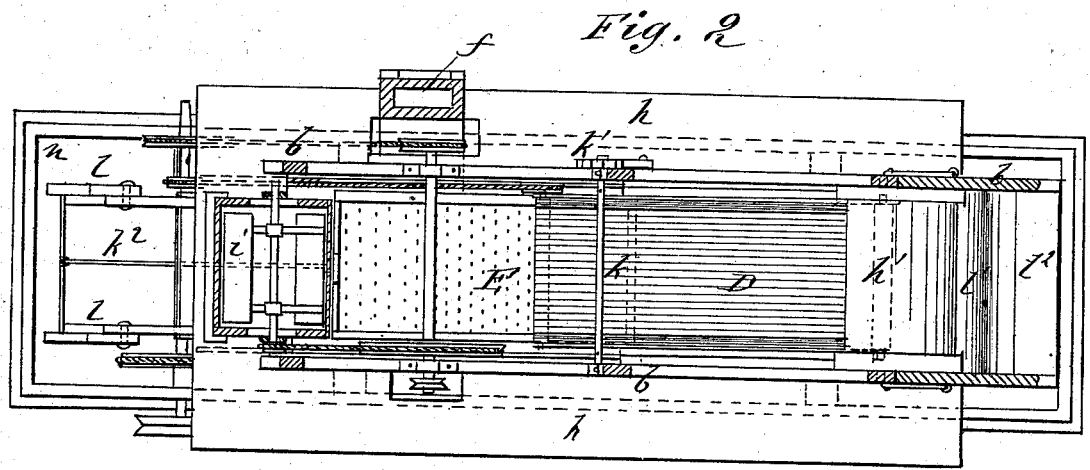
WITNESSES:
C. Neveux
B. G. Underwood
INVENTOR:
H. Newlin.
BY Munn & Co
ATTORNEYS.
N. PETERS, PHOTO-LITHOGRAPHER, WASHINGTON, D. C.

(No Model.) 2 Sheets—Sheet 2.
H. NEWLIN.
Machine for Separating Street Refuse and other Material.
No. 239,826. Patented April 5, 1881.
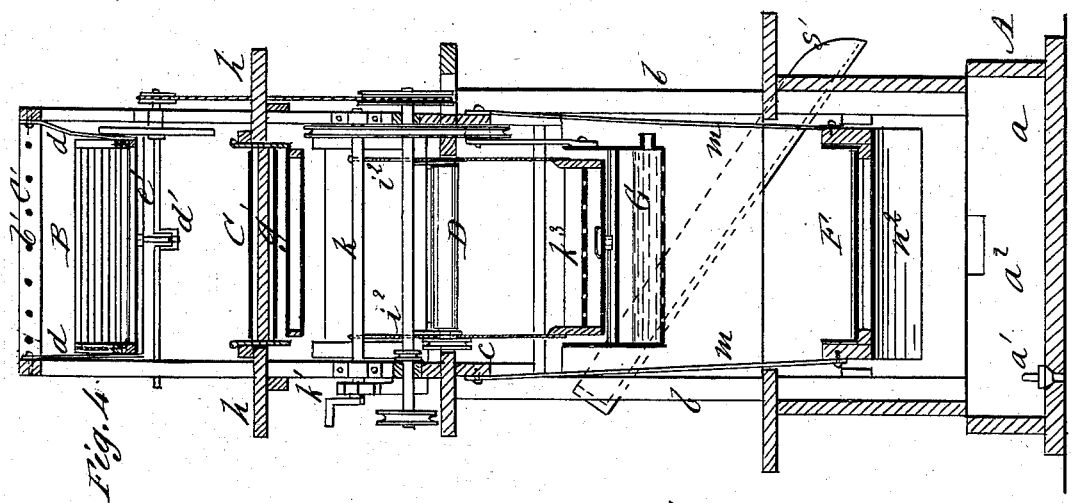
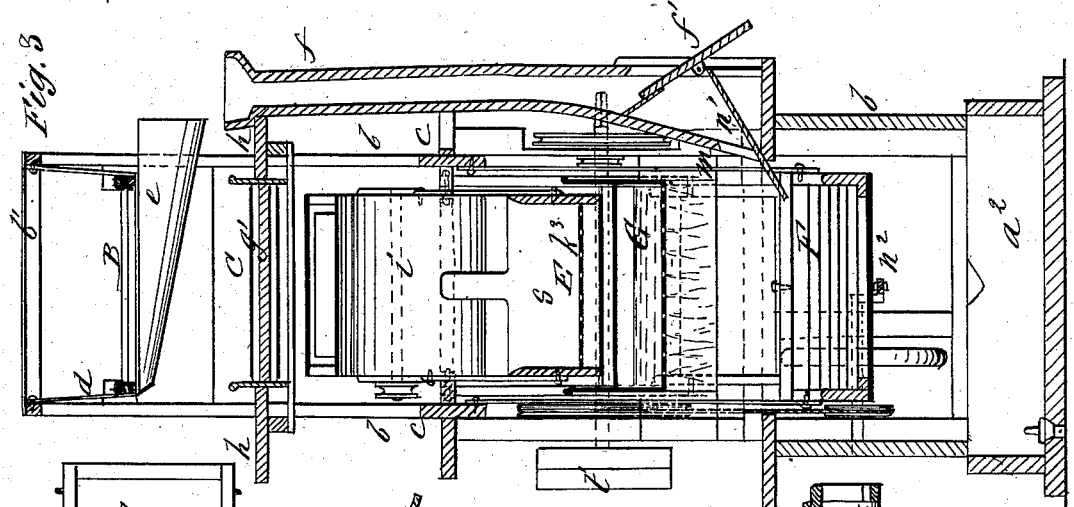
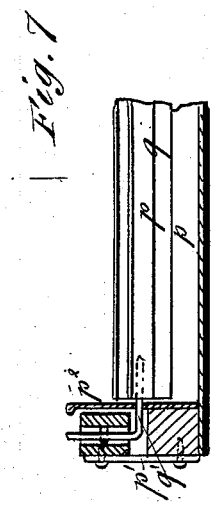
WITNESSES:
C. Neveux
B. G. Underwood
INVENTOR:
H. Newlin.
BY Munn & Co
ATTORNEYS.

UNITED STATES PATENT OFFICE.

HOWARD NEWLIN, OF BROOKLYN, ASSIGNOR OF ONE-HALF TO CHARLES PLACE, GEORGE W. DEBWOISE, AND ROSEWELL G. ROLSTON, OF NEW YORK, N. Y.

MACHINE FOR SEPARATING STREET-REFUSE AND OTHER MATERIAL.

SPECIFICATION forming part of Letters Patent No. 239,826, dated April 5, 1881.

Application filed August 24, 1880. (No model.)

*To all whom it may concern:*

Be it known that I, HOWARD NEWLIN, of Brooklyn, in the county of Kings and State of New York, have invented a new and useful Improvement in Machines for Separating Street-Refuse and other Material, of which the following is a specification.

The principal object of my invention is to construct a machine for treating street refuse or sweepings, or for the separation therefrom of materials having value.

My improved machine is also adapted for use in separating garbage and ashes, coal and coal-dust, and the cleaning and separation of coffee, rice, and other grains.

My invention consists in a combination of endless traveling belts, screens, blowers, and washing-tanks, forming the complete machine, whereby the material is separated and washed, and further separated by specific gravity, if required; also, in separating-screens and water-tanks of novel construction, all of which features are described in detail hereinafter, with reference to the accompanying drawings, forming part of this specification.

In the drawings, Figure 1 is a vertical longitudinal section of the machine. Fig. 2 is a horizontal section on line $x\ x$ of Fig. 1. Fig. 3 is a vertical transverse section on line $y\ y$ of Fig. 1. Fig. 4 is a vertical transverse section on line $z\ z$ of Fig. 1. Fig. 5 is a detail plan view of the water-tank. Figs. 6 and 7 are detail sections of the adjustable screen. Fig. 8 is a section of the screen in a modified form.

Similar letters of reference indicate corresponding parts.

The base of the machine consists of a tank, A, made in oblong rectangular form, of suitable depth, and divided into three or more compartments, $a$, by partitions $a^2$, which are somewhat less in depth than the sides and ends of the tank. In the bottom of each compartment is fitted a valve, $a'$, covering a discharge-opening. The screens, tanks, and other mechanism are sustained by standards $b$, that rise from tank A, and suitable longitudinal and cross bars $c$, which form a frame of suitable size and strength, and which may be inclosed by a casing, if desired. The top of the frame is covered by a plate, $b'$, in which is a screened opening, $c'$, through which the material is to be fed.

Beneath the plate $b'$ a screen, B, is hung by links $d$, and fitted for vibration by means of a rod, $d'$, passing to a crank-shaft, $d^2$, that is fitted in suitable bearings at the end of the frame. On the lower side of screen B is fixed a plate, $e'$, that terminates in a cross-trough, $e$, which extends into a delivery-spout, $f$, at the side of the machine. The lower end of spout $f$ is fitted with a swinging shutter, $f'$, which is used for directing the material outside of the machine or upon the washing-screen, hereinafter described.

Beneath screen B is an endless apron or belt, C, that is sustained at the opposite ends of the machine by revolving shafts $g$, fitted in suitable bearings. This belt is the full width of the machine, and runs over and under a fixed board, $g'$, that serves to sustain the apron C when loaded with material from screen B. Side plates for retaining the material on the apron are also provided, and at the sides of the frame, supported by standards $b$, are platforms or galleries $h$ for the workmen, from which access can be had to the material passing over the apron C.

Beneath the delivery end of apron C is fixed an inclined board, $h'$, to receive the material as it drops from the apron and direct the same to the short endless apron D. The apron D is sustained on shafts $h^2$, that move it in opposite direction to the movement of belt C. There is also beneath the apron C a blower, $i$, having its outlet-pipe extended to act on the material as it falls from the apron C to blow away the lighter materials.

E is the washing-tank or box, hung beneath the delivery end of apron D by chains $i'\ i^2$. The chains $i^2$ at the inner end of the tank are connected with a drum or shaft, $k$, which is fitted in bearings on the central standards, $b$, and which is provided with a crank-handle for winding the chains, and a ratchet-wheel, $k'$, that is engaged by a pawl, so that the inner end of the box may be raised when it is used for dry separation, as hereinafter described. The box or tank E is provided with a false bottom, $k^3$, of perforated material, beneath which is the nozzle $t$ of a water-pipe, (shown most clearly in Fig. 5,) which supplies the tank with water. The water will flow up through the perforated bottom and run over the inner end of the tank, which end is lower, and the materials will be carried off by the water. The upper end of tank E is fitted with a shutter, $s$, that is to be closed when the tank is used for washing. There is a chute, $i^3$, fitted beneath the delivery end of box E, to direct the water and the material from the tank to a delivery-spout, $s'$, that is fitted at the end of the machine.

Beneath the outer end of tank E is fitted an endless apron, H, used in the dry separation, as hereinafter described.

A rod, $k^2$, extends from tank E to vibrating arms $l$, that are hung on the end of the machine, so that the tank is vibrated to insure a more thorough washing and separation of the materials.

The inclined board $h'$ is hung on pivots, so that it can be tilted to incline in the direction for carrying the material to apron D or in the opposite to deliver the material to the discharge-spout $l'$ instead. This latter will be done in case no washing or further separation is required. The lighter material will be at the same time carried by the blast from blower $i$ to the delivery-chute $l^2$.

In the lower part of the machine, above the tank A, is fitted a vibrating screen, F, for washing and separating the material passing through the screen B, and also for receiving materials directly which do not require the first screening operation, such as coal-ashes containing coal, or other material not mixed with garbage. This screen is hung on links $m$, and connects by a rod, $m'$, with a crank-shaft, $m^2$, whereby the screen is vibrated.

To the upper end of screen F is connected the lower end of a chute, $n$, that is suspended from the pivoted arms $l$, before mentioned, whereby the chute is vibrated with the screen, so that material placed in chute $n$ shall be fed to the screen F. These connections serve also to vibrate the washing-tank E.

On the lower end of spout $f$, that receives the material from screen B, is a chute, $n'$, for directing the material to the screen F when the shutter $f'$ is properly turned. The lower side of the screen F is fitted with a plate, $n^2$, for receiving the material passing through and directing the same to one compartment $a$ of tank A, while the larger substances pass over the screen to the end compartment $a$.

Above screen F is fixed a water-tank, G, supplied with water by a pipe at O, and having a perforated bottom, so that the water will be discharged in small streams upon screen F, and run from thence to tank A. The end compartment $a$ of tank A is separated from the others by a deep partition, in which is a narrow slot, so that the water with floating matters can run to the second compartment $a$, while the heavy materials sink. A small opening, $a^3$, in the side of the first compartment allows overflow, to keep the water at a proper level. The second compartment $a$, which receives the material passing through screen F, is divided from the third by a low partition, so that the water will readily run over, carrying with it all except materials heavy enough to instantly sink. The third compartment is separated from the fourth by a higher partition, and so on with any number of compartments required to the last, which has an overflow-opening, $a^4$, for the escape of the water. With this arrangement the materials are separated by specific gravity, and only the lighter portions carried off with the water. The valves $a'$ are to be opened for discharge of the materials.

The screens B F are of novel construction, as shown most clearly in Figs. 6 and 7. The side frames consist of parallel bars $p\ p$, hinged together by links $p'$, the lower bar at each side being fitted with a plate, $p^2$, for retaining the material upon the screen. Between the side frames are shutters $q$, with pivots $q'$, that have bearings in plates $p^2$, which pivots at one side of the screen are bent upward at their outer ends through apertures in the upper bar $p$, and are held therein by staples. By sliding the upper bar $p$ lengthwise the shutters $q$ are opened and closed to the extent required. A screen of this construction is not likely to clog, and, being adjustable, there is no necessity of changing the screen for different materials. The receiving-plates $e'\ n'$ of the screen are attached to the lower bars $p$.

In place of screen F, the one shown in Fig. 8 may be used. This is formed with a perforated bottom, $r$, that is corrugated crosswise, and is fitted at the under side with a trough-shaped plate, $r'$, for receiving the material passing through the bottom $r$. The corrugations serve to collect the finer materials as the screen is vibrated, and prevent them from being carried off with the larger materials.

In operation, if ordinary street-refuse is to be separated, it will be fed by a suitable hopper or thrown upon the screened opening $c'$, through which it passes to screen B. That which goes through the screen goes, by spout $f$, to suitable receptacles; or, if it is to be further treated by a dry or wet process, it goes to tank E. That which goes over the screen falls upon the apron C, on which it is spread in a thin sheet and carried slowly along, so that opportunity is given for the workmen on the gallery $h$ to remove small articles of value or useless materials of large size, which might hinder further operations. From apron C the material goes by board $h'$ out of the machine by chute $l'$, the light stuff being carried to chute $l^2$ by the blast of air; or, if further operation is required, the material goes to apron D and box E. If a dry process is to be used, the inner end of box E is to be raised and shutter $s$ opened, so that the finer material is discharged to the apron H and carried to chute $n$, while larger materials pass over the inner end of box E to chute $i^3$ and out of the machine. From chute $n$ the materials go to screen F, where they are washed and separated previous to final separation in tank A, as before described. By these various separations and washings refuse of any character is divided, and the portions having value removed from those that are useless. The treatment will be necessarily regulated by the character of the material, and my machine provides for whatever may be required, either separation by size, weight, or specific gravity, by washing or by combining these operations.

The machine is to be driven by suitable power.

At $t$ is shown a pulley and driving-shaft for connection to power, and the shafts of the screens, aprons, and blower are connected to the driving-shaft by belts.

Having thus described my invention, I claim as new and desire to secure by Letters Patent—

1. The machine for separating street-refuse and other materials, consisting of the vibrating screen B, provided with plate $e'$ and discharge-trough $e$, endless traveling apron C, provided with board $g'$, adjustable board $h'$, blower $i$, endless traveling apron D, washing-tank E, provided with water-supply nozzle $t$, and delivery-chute $i^3$, all substantially as shown and described, and combined for operation as specified.

2. In machines for separating street-refuse and other material, the box or tank E, provided with a water-supply pipe, shutter $s$, and elevating-chairs $i^2$, substantially as shown and described, whereby it is adapted for use as a washer or dry separator, as set forth.

3. In machines for separating street-refuse and other materials, the vibrating screen F, provided with chute $n$, water-tank G, having perforated bottom, and receiving-tank A, combined together and with the delivery-apron H and spout $f$ of the dry separators, substantially as and for the purpose set forth.

4. In machines for separating street-refuse and other materials, the receiving-tank A, divided by partitions $a^2$, and provided with outlets $a^3$ $a^4$, substantially as and for the purpose set forth.

5. In machines for separating street-refuse and other materials, the screens F B, consisting of adjustable side bars, $p$, provided with pivoted shutters $g$, substantially as and for the purpose set forth.

HOWARD NEWLIN.

Witnesses:
GEO. D. WALKER,
C. SEDGWICK.